Aug. 14, 1951 — A. N. MacARTHUR — 2,564,402
DRAIN PIPE BLOW-OUT PLUG
Filed Feb. 26, 1948

INVENTOR
ARCHIBALD N. MAC ARTHUR
BY
ATTORNEYS

Patented Aug. 14, 1951

2,564,402

UNITED STATES PATENT OFFICE 2,564,402

DRAIN PIPE BLOW-OUT PLUG

Archibald N. MacArthur, Oshkosh, Wis.

Application February 26, 1948, Serial No. 11,039

1 Claim. (Cl. 134—166)

My invention refers to a clean-out for clogged drain pipes of plumbing systems, especially applicable to a standard T coupling having aligning vent and drain nipples intersected by a clean-out nipple, which clean-out nipple is normally closed by a cap in threaded connection therewith.

The primary object of my invention is to provide a simple and effective resilient channeled plug stopper to be inserted in the clean-out nipple for cutting off the vent nipple or pipe and establishing communication with the drain pipe nipple. Thereafter a fluid, under pressure, supply pipe is coupled to the channel plug, whereby a clog or choke in the drain pipe is instantly cleared without damage to the plumbing system.

In supplying fluid, under pressure, it is understood that either air, steam or water may be utilized, under certain conditions. Thus, such crude and expensive devices as a flexible rod is dispensed with, or, in the event of the failure of the rod to function, it may be necessary to dismantle the drain pipe connections.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

Referring by characters to the drawings, A indicates a standard coupling of the T shape, having a vent nipple B and a drain nipple C, which are in alignment and have connected thereto pipes D and E respectively.

The T coupling A is provided with a transversely disposed clean-out nipple F, which nipple, when not in use, is provided with a cap closure (not shown).

Figure 2:
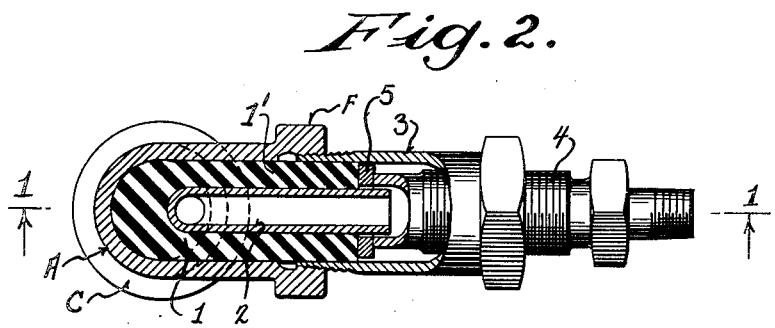
Fig. 2 is a plan sectional view of the same, the section being indicated by line 2—2 of Fig. 1.
Figure 3:
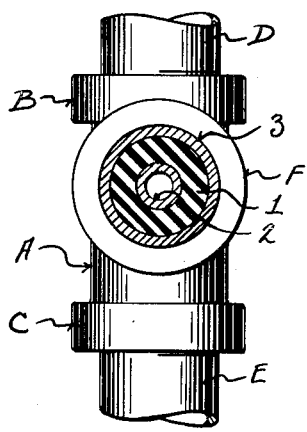
Fig. 3 is a cross section of the device, the section being indicated by line 3—3 of Fig. 1.

When it is desired to cut off communication between the vent pipe and drain pipe, a rubber circular plug 1 is inserted within the clean-out nipple F and its inner end, as shown in Fig. 2 of the drawings, is semi-circular in form, whereby the plug completely closes the communication between the upper and lower nipples. The plug includes an outwardly extending substantially cylindrical stem portion 1' which is snugly nested within the bore of the nipple.

The plug with its stem portion 1' is provided with a metallic tube 2, the inner end of which is bowed downwardly while the outer end projects slightly beyond the end of the plug, it being noted that said plug is molded about the tube 2. For convenience in assemblage, the stem end of the plug 1 is encased in a bushing 3, the inner end of which bushing is in threaded union with the nipple F. The bore of the bushing is provided with internal threads 3' for threaded engagement with a sleeve 4, the inner end of said sleeve being in abutting engagement with a compression ring 5, which ring is fitted to the end of the plug 1.

The outer end of the sleeve 4 is reduced for the reception of a flexible pipe (not shown), which pipe communicates with a source of supply either of steam, air, or water under pressure.

It will be noted that the plug when compressed longitudinally by the ring 5 and sleeve 4 will expand transversely, whereby said plug 1 will frictionally engage the bore walls of the coupling.

Figure 1:
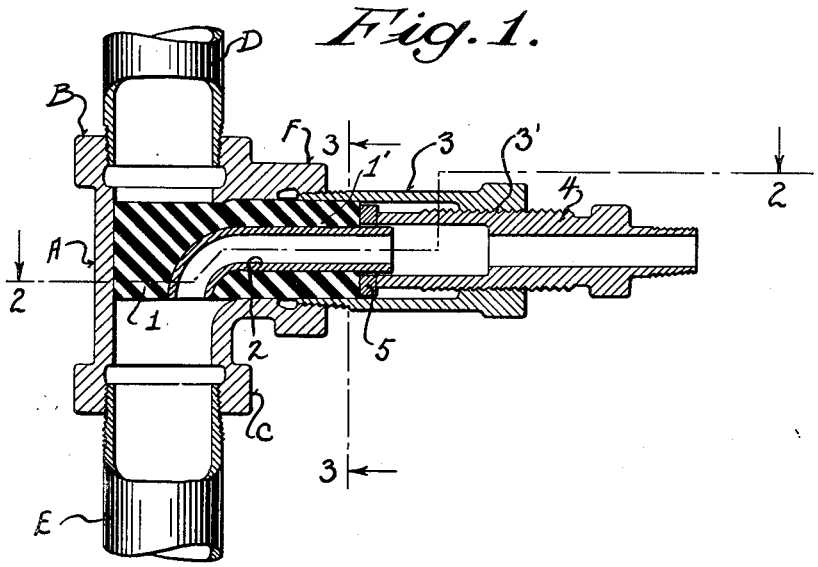
Fig. 1 represents a sectional elevation of a standard T having fitted thereto a plug embodying the features of my invention, the section being indicated by line 1—1 of Fig. 2.

When the assemblage is fitted to the T coupling unit, as shown in Fig. 1 of the drawings, the sleeve 4 is rotated within the bushing, whereby the end of said sleeve will exert compression upon the flexible rubber plug to thus firmly seat the same within the T coupling, whereby an air-tight joint is effected between the vent pipe and drain pipe.

To clear out a clogged drain pipe, the fluid under pressure is supplied to the drain pipe through sleeve 4, and the pressure developed will blow out the obstruction in the drain pipe. Thus it is apparent that when a clog develops in the pipe system of a dwelling, it can readily be eliminated by those unskilled in the plumbing art if an emergency should arise.

While I have specifically illustrated and described one simple exemplification of my invention minutely as to detail, it is understood that I may vary such detail within the scope of the claim.

I claim:

In a drainage pipe having a standard T coupling provided with aligned drain and vent nipples and an intermediate threaded clean-out nipple, all of the same being of uniform circular bore; a drainage pipe blow-out comprising a rubber plug fitted into the clean-out nipple, having a semi-circular inner end of the same diameter as the bore of the coupling and an outwardly projecting stem portion, a metallic tube embedded in the plug, the outer end of the tube projecting beyond the outer end of the stem, the inner end of the tube being bowed and extended through the outer surface of the plug, the said plug being molded about the tube, a compression ring loosely mounted upon the projecting end of the tube, a bushing fitted over the plug stem in threaded union with the coupling clean-out nipple, and a sleeve in threaded union with the end of the bushing, the inner end of the sleeve being in abutting engagement with the compression ring, whereby the end and peripheral faces of the plug stem are expanded against the bore walls of the T coupling by the sleeve end against the compression ring when said sleeve is rotated through its threaded connection with the bushing.

ARCHIBALD N. MacARTHUR.

REFERENCES CITED

The following references are of record in the file of this patent:

UNITED STATES PATENTS

| Number | Name | Date |
|---|---|---|
| 1,212,886 | Benson | Jan. 16, 1917 |
| 1,311,287 | Murphy | July 29, 1919 |
| 1,627,928 | Pressler | May 10, 1927 |
| 1,655,796 | Murphy | Jan. 10, 1928 |
| 1,706,131 | Averill et al. | Mar. 19, 1929 |

FOREIGN PATENTS

| Number | Country | Date |
|---|---|---|
| 455,176 | France | May 15, 1913 |